Feb. 21, 1956     T. G. FAULKNER     2,735,209
PLASTIC FISH BAIT
Filed May 10, 1954
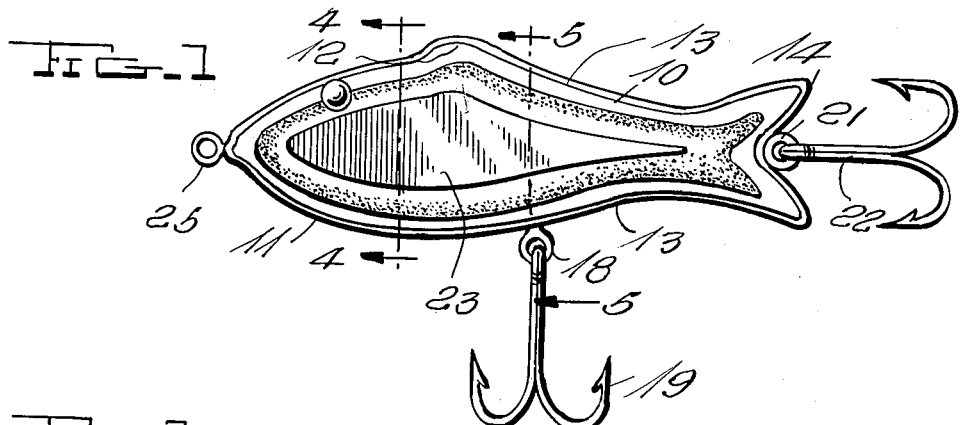
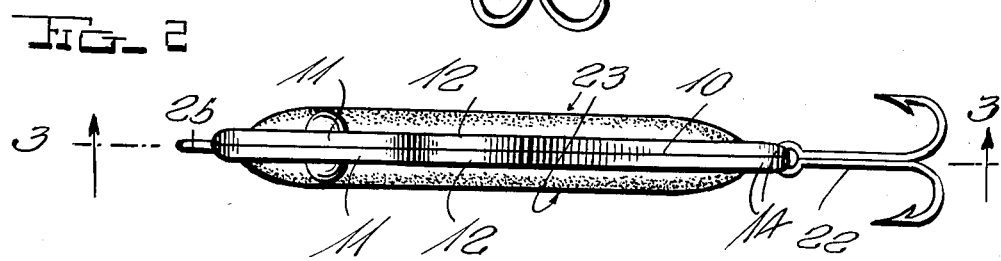
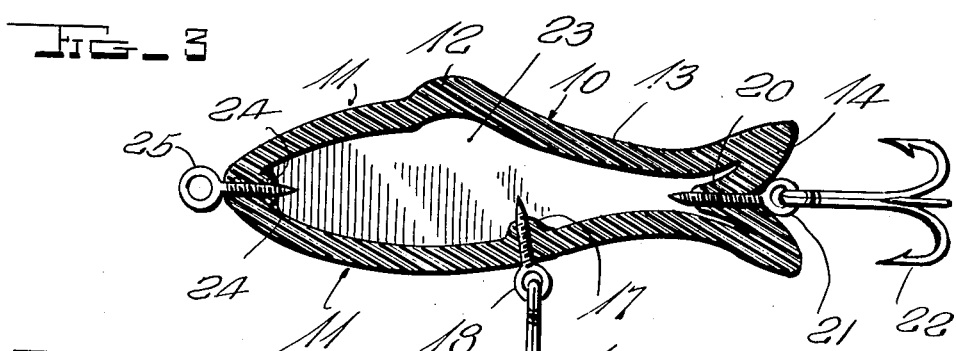
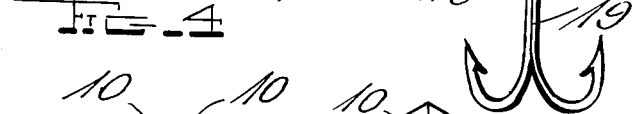
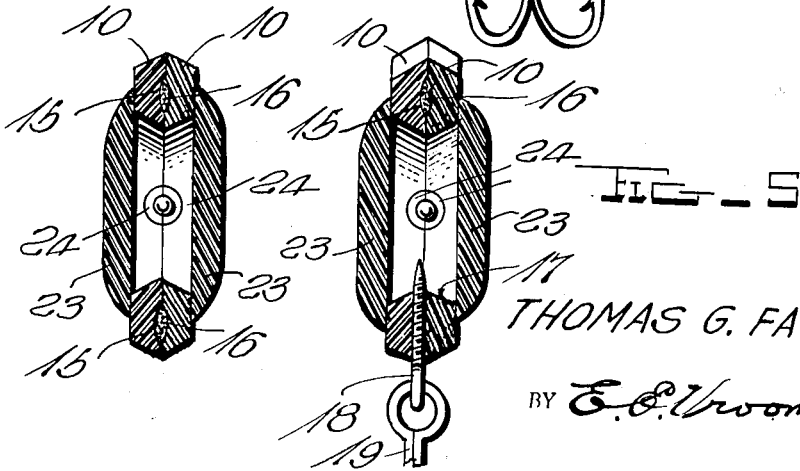
INVENTOR,
THOMAS G. FAULKNER,
BY
ATTORNEYS.

United States Patent Office 2,735,209
Patented Feb. 21, 1956

2,735,209

PLASTIC FISH BAIT

Thomas G. Faulkner, Tampa, Fla.

Application May 10, 1954, Serial No. 428,583

1 Claim. (Cl. 43—42.35)

This invention relates to a fish lure and method of its manufacture.

One important object of the invention is to make a fish lure of hollow construction which may be readily formed without the necessity of any inner cores.

A second important object of the invention is to provide for the construction of a fish lure closely resembling a small fish and provided with tail and anal hooks.

A third important object of the invention is to provide a hollow fish lure so stiffened against vertical deformation as to prevent crushing of the lure in a vertical direction.

A fourth important object of the invention is to provide a fish lure which is constructed of parts, all of which may be manufactured by simple dyes.

A fifth important object of the invention is to provide a novel means for assembling the various parts of such a fish lure.

With the above and other objects of the invention, the invention consists in general of a novel form of fish lure and a novel means of manufacturing the same.

With the above and other objets in view, the invention further consists of said novel details of construction and combinations of parts, together with certain steps in the assembling of these parts hereinafter fully described, illustrated in the accompanying drawings and particularly claimed.

In the accompanying drawings, like characters of reference indicate like parts, in the several views.

Fig. 1 is a view of one half of the lure in elevation, the view being taken on the vertical, longitudinal median or spinal section of the lure.

Fig. 2 is a top plan view of the complete lure, the half of which is shown in Fig. 1.

Fig. 3 is a section on the line 3—3 of Fig. 2.

Fig. 4 is a section on the line 4—4 of Fig. 1, the section being substantially enlarged.

Fig. 5 is a section similar to Fig. 4 but on the line 5—5 of Fig. 1.

In the construction of this invention there is provided a pair of vertical frames 10 in the form of an outline of the fish as viewed from one side. These frames each have a forwardly extending portion 11 just to the rear of which, on upper side of the form, is an upwardly extending portion 12 representing the upper fin of the lure. From this upper fin of the lure the members 10 contract rearwardly as at 13 to terminate in a tail portion 14. These members 10 are provided on their proximal sides with grooves 15 for the reception of cement 16.

In the construction of this part of the invention the two members are placed together with their grooved sides confronting, the grooves having cement 16 placed therein so that upon lateral pressure the members 10 are fixedly secured together. Each of these members 10 has on the upper face of its lower side a projection 17 which, when the two are united, forms an inwardly extending boss so that a screw eye 18 may be inserted to hold securely and support a triple hook 19. In the same manner the tail portions 14 of the members 10 project inwardly in a forward direction as at 20 (see Fig. 3) to provide a boss for the insertion and holding of a screw eye 21 carrying a triple hook 22.

Each of the side members 23 is prepared from a plastic material to represent each side of the lure. These side members may be colored and ornamented in any desired manner. At the forward end of the members 10 there are provided rearwardly projecting bosses 24 for the reception of a screw eye 25 enabling the fish line to be attached to the lure.

After the members 10 have been pressed together the two side members of plastic material are brought into contact therewith as shown clearly in Figs. 4 and 5 and are pressed so that the peripheral edges of these side members cling firmly to the members 10.

Thus there is provided a fish lure having a relatively rigid back bone-like frame and slightly less rigid sides.

It is obvious that minor changes may be made in the form and construction of this invention without departing from the material principles thereof.

What is claimed as new is:

In a device of the kind described, a reinforcing element shaped to represent the vertical side elevation of a fish, said reinforcing element comprising a pair of forms each defining the peripheral outline of a fish and having a hollow interior and each having an inwardly projecting front and rear portion, said respective front portions being joined together and said rear portions being joined together to form inwardly projecting bosses, said pair of forms having grooves in the proximal sides thereof, a cementitious material in said grooves for securing said forms together in aligned relation, side plates being peripherally secured to the outer side of said forms and spaced from one another by said reinforcing elements to form a hollow lure, said bosses forming means for the attachment of hooks, and a tow line.

References Cited in the file of this patent

UNITED STATES PATENTS

| | | |
|---|---|---|
| 538,169 | Kelly | Apr. 23, 1895 |
| 1,742,625 | Weckerle | Jan. 7, 1930 |
| 2,234,439 | Larson | Mar. 11, 1941 |
| 2,594,673 | Nichols | Apr. 29, 1952 |
| 2,670,599 | Webb et al. | Mar. 2, 1954 |